United States Patent [19]
Reid

[11] Patent Number: 5,266,200
[45] Date of Patent: * Nov. 30, 1993

[54] SEQUENCE CONTINUOUS REACTION IN COMPLETE MIX ACTIVATED SLUDGE SYSTEMS

[76] Inventor: John H. Reid, 1210 Princess Anne St., Fredericksburg, Va. 22401

[*] Notice: The portion of the term of this patent subsequent to Apr. 17, 2007 has been disclaimed.

[21] Appl. No.: 686,401

[22] Filed: Apr. 17, 1991

[51] Int. Cl.$^5$ ............................................. C02F 3/30
[52] U.S. Cl. .................................. 210/605; 210/614; 210/629; 210/903; 210/906; 210/926
[58] Field of Search .............. 210/403, 906, 926, 605, 210/608, 612, 614, 626-631

[56] References Cited

U.S. PATENT DOCUMENTS

| | | | |
|---|---|---|---|
| 3,342,727 | 9/1967 | Bringle | 210/15 |
| 3,900,394 | 8/1975 | Rongved | 210/906 |
| 4,537,682 | 8/1985 | Wong-Chong | 210/611 |
| 4,655,925 | 4/1987 | Tabata et al. | 210/605 |
| 4,705,633 | 11/1987 | Bogusch | 210/614 |
| 4,917,805 | 4/1990 | Reid | 210/605 |
| 4,948,510 | 8/1990 | Todd et al. | 210/903 |
| 4,999,111 | 3/1991 | Williamson | 210/605 |
| 5,392,551 | 8/1978 | Asada et al. | |

Primary Examiner—Thomas Wyse
Attorney, Agent, or Firm—Marion F. Lelong

[57] ABSTRACT

A complete mix activated sludge basin is operated as a Sequence Continuous Reactor by cyclically aerating the mixed liquor to form an aerobic cycle at selected high dissolved oxygen levels, during which nitrification takes place, and cyclically mixing the liquor without aerating to form anoxic cycles at selected low dissolved oxygen levels, during which denitrification takes place. Field adjustments can be made by the operator in the dissolved oxygen levels and in the duration of the aerobic and anoxic cycles, whereby ammonia removal, nitrification, and denitrification can continue to be done efficiently during both summer and winter temperature conditions, during conditions varying from warm to cold inlet wastewater temperatures, during extreme variations in food supply, and during pronounced variations in biomass concentration and activity.

21 Claims, 5 Drawing Sheets

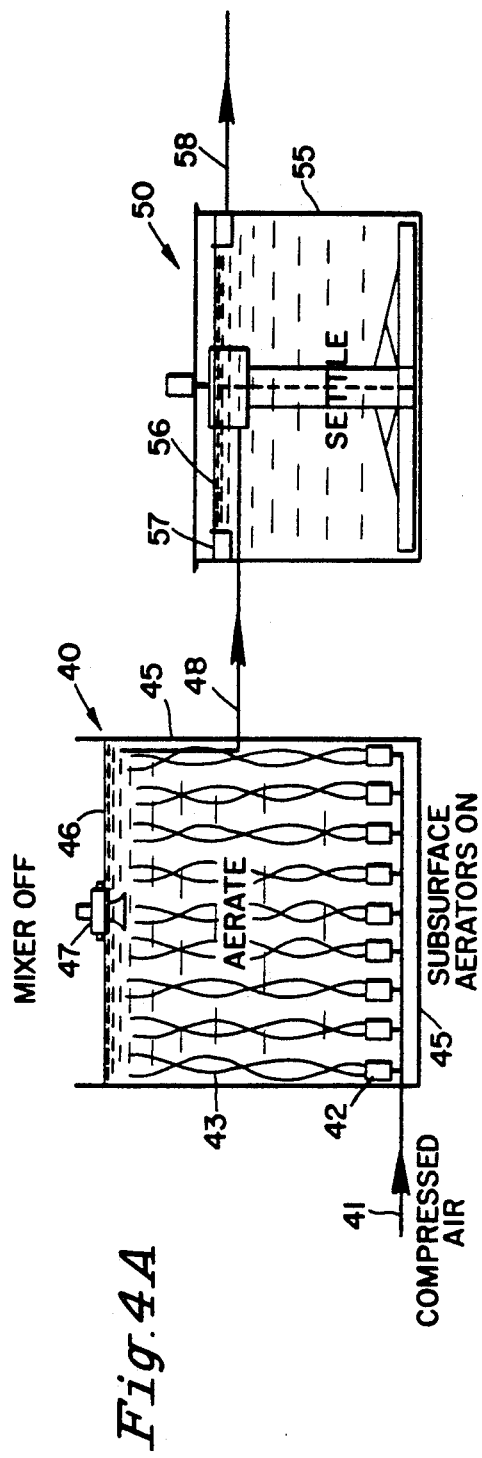
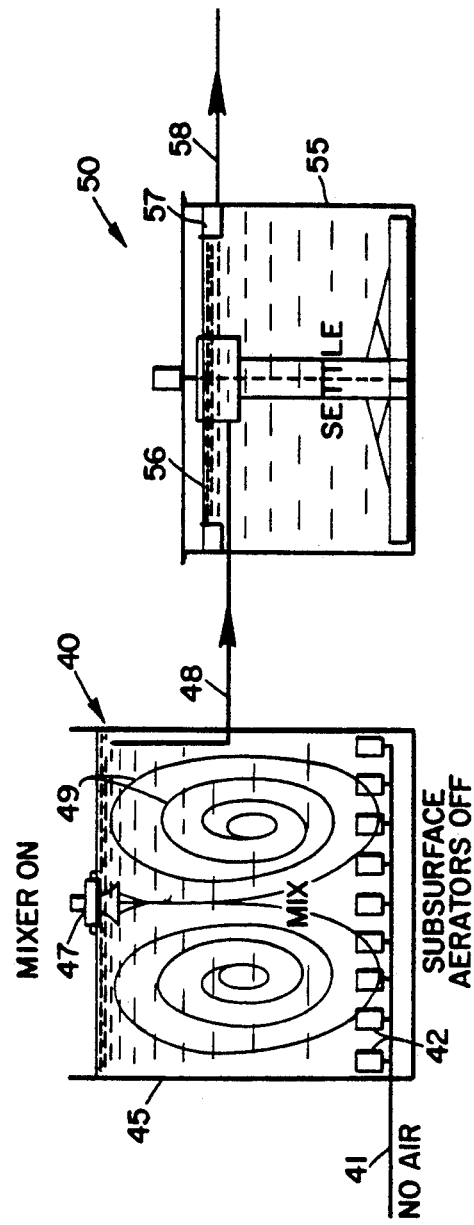

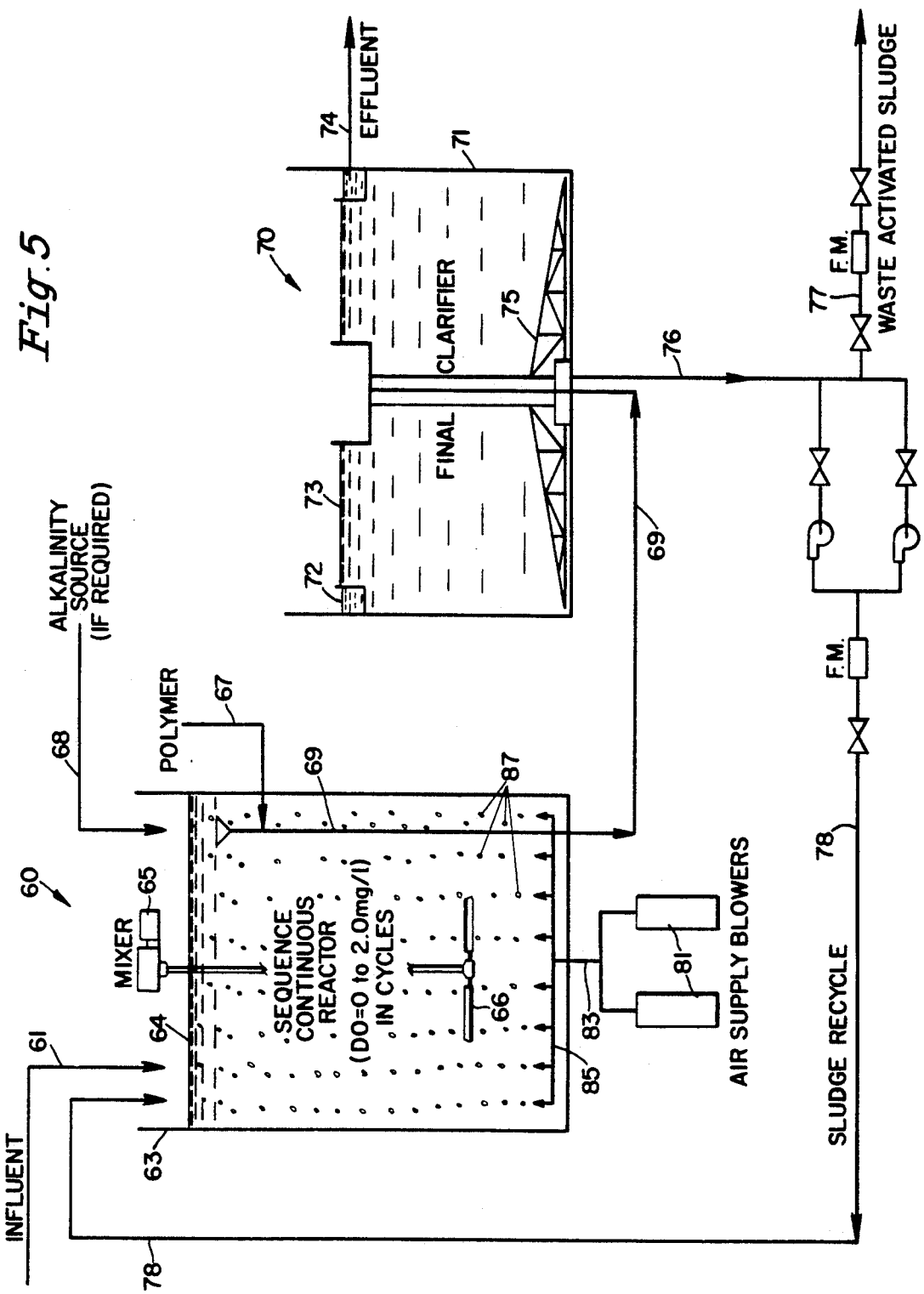

SEQUENCE CONTINUOUS REACTION IN COMPLETE MIX ACTIVATED SLUDGE SYSTEMS

BACKGROUND OF THE INVENTION

1. Field of the Invention

This invention relates to treatment of wastewaters by the complete mix activated sludge process and particularly relates to utilization of this process in a single tank or basin for nitrification of ammonia in the wastewaters and for denitrification of the nitrites and/or nitrates formed therefrom.

2. Review of the Prior Art

Complete mix systems are designed so that if samples are taken simultaneously over the basin area, the measured properties are essentially uniform. As one of these properties, the dissolved-oxygen content (D.O.) is maintained as uniformly as possible at an average dissolved-oxygen content above one milligram per liter, so that aerobic conditions are continuously maintained in the treatment reactor or basin. These relatively constant and high-D.O. aerobic conditions are needed in order to maintain the normally required efficiencies of removing carbonaceous oxygen-demanding pollutants and nitrogenous oxygen-demanding pollutants from wastewaters.

In practice, the D.O. concentration is usually not uniform because higher D.O. concentrations are found closer to the aerators and to the liquid surface (particularly if surface aerators are used) and because lower D.O. concentrations are found near the sides and the bottom of the basin.

Complete mixing is commonly conducted in round, square, or rectangular tanks or basins into which incoming wastewater is fed at numerous places. The contents of the basins are thoroughly mixed to insure that the incoming wastewater is rapidly dispersed throughout the basins, in contrast to plug-flow systems. The volume of mixed liquor in a basin is so much greater than the volume of the incoming wastewater that the wastewater is overwhelmingly dominated by the basin contents. Also, there is a uniform concentration of mixed liquor-suspended solids (MLSS) to be found in complete mix aeration basins, as contrasted with the variable concentration noted in plug-flow and semi-plug flow tanks.

It should be understood that the mixed liquor in a complete mix activated sludge basin does not flow translationally, as in a smoothly flowing river or an oxidation ditch, wherein the translational flow is typically 1-3 feet per second. Instead, it moves onward very slowly, the hydraulic retention time within the basin typically being 6-60 hours, depending upon the strength of the incoming wastewater and the treatment requirements. However, it is not stagnant because the mixing devices move the liquor vertically, horizontally, and radially. A toroidal flow pattern around each mixing device is indeed a common occurrence so that each particle of mixed liquor is exposed repeatedly but randomly to contact with oxygen while the aerators are in operation.

Ammonia, derived from decomposition of proteins, is present in many wastewaters as a contaminant that must be removed because it is toxic to many forms of aquatic life at concentrations as low as one p.p.m. The mixture of microorganisms that exists in a barrier oxidation ditch is very well suited for, such removal by ammonia oxidation to nitrite with Nitrosomas (e.g., *Nitrosomas europea*), oxidation of nitrite to nitrate with Nitrobacter (e.g., *Nitrobacter winnogradski* and *Nitrobacter agilis*) and denitrification by reduction of the nitrite and/or nitrate to nitrogen gas with facultative heterotrophic microorganisms generally of the genera of Pseudomanas, Achromobacter, Bacillius, and Micrococcus. All of these microorganisms are ubiquitous in the environment. Both Nitrosomas and Nitrobacter require a dissolved oxygen level in excess of approximately 0.5 mg/l and preferably greater than 1.0 mg/l.

When operated with a constant high D.O. above one milligram per liter, the complete mix activated sludge process will provide high efficiency ammonia removal by biological nitrification. This continuous high D.O. process, however, does not have the ability to remove nitrites and nitrates that are produced in the nitrification process.

The cyclical complete mix activated sludge process that is disclosed in U.S. Pat. No. 4,917,805 of John H. Reid does provide a means whereby a complete mix activated sludge process can be operated to provide ammonia removal by nitrification and both nitrite and nitrate removal by biological denitrification. Biological denitrification is achieved in this cyclical complete mix activated sludge process by cycling the D.O. in the complete mix activated sludge basin in what was believed to be a sine wave pattern, similar, to the dissolved oxygen profile that would be experienced by bacteria circulating in a typical total barrier oxidation ditch activated sludge reactor.

Subsequent experimentation, however, demonstrated that the curve for the oxygen uptake rate in a total barrier oxidation ditch is steep and asymptotically decreases, and the curve for its oxygen consumption rate also shows asymptotic decrease. Moreover, it proved to be very difficult to control the air compressors in a complete mix system (especially in large basins having big air compressors) within close time sequences. For example, when an air compressor would be started by the plant operator., the D.O. level would automatically rise until the desired aerobic high D.O. level was reached at which time the air compressor intake valve would be throttled to maintain this desired aerobic level, but the amount of time required for the D.O. to rise and then drop again was too great because the centrifugal compressors slowed down rapidly but gradually arid, after being stopped for the anoxic cycle, started up again gradually with no surge, using a reduced voltage start followed by gradually increasing voltage. In other words, too much time was consumed in starting and stopping big compressors. On the other hand, if two CMAS system basins, supplied by the same centrifugal compressors, should be available, the process described in U.S. Pat. No. 4,917,805 should be practical.

A barrier oxidation ditch of such nitrification/denitrification capability operates on approximately a 6-18 minute cycle and contains microorganisms having a long sludge age or mean cell residence time (MCRT) involving much endogenous respiration in which cells die and lyse, releasing their nutrients which are consumed by other cells so that they become increasingly mineralized.

A barrier oxidation ditch must be operated entirely differently in summertime and in wintertime. When operating a barrier oxidation ditch during wintertime, denitrification becomes difficult when oxygen uptake becomes increasingly rapid as the mixed liquor becomes colder, the D.O. level tends to become increasingly greater, and the anoxic portion of the ditch tends to become increasingly shorter. In summertime, it can become quite difficult to attain a high enough D.O. level for the aerobic portion of the ditch while the biomass uptake and activity are greatly increased. In other words, not only weather, but also slug loads of food and activity of the biomass can affect the lengths of the aerobic and anoxic portions of the ditch. These factors are also of importance in other systems, such as CMAS basins.

Most attempts to accomplish cyclical oxic-anoxic GMAS basin operation and resulting nitrification-denitrification are believed to have utilized fill-and-draw sequence batch reactors (SBR). However, such sequence batch reactors, which do provide the closest approach to complete control of high and low D.O.'s that is believed to be achievable in a CMAS system, are operated mainly for settling of the sludge. The air must be shut off for awhile to permit such settling to occur, whereby the clarified liquor can be removed from the top portion of the tank and the settled sludge can be taken from its bottom, a portion of this sludge being removed from the complete mix basin as waste sludge. The practical drawback to SBR operation is the length of time required for settling, causing only 2-4 cycles/day (6 under exceptional circumstances) to be available.

Because the autotrophic microorganisms such as Nitrosomas and Nitrobacter grow much more slowly (for example, on the order of five to ten times more slowly) than the facultative heterotrophic microorganisms, an acclimation period of up to one to three months may be necessary, although maintaining a pH and temperature just below the maximum and a D.O. level just above the minimum can minimize this period.

As an example of processes adapted to cope with such differences in bacterial growth rates, the nitrification process disclosed in U.S. Pat. No. 4,705,633 increases the efficiency of nitrification by increasing the population of nitrifying bacteria beyond that which would naturally occur in a nitrifying activated sludge system by using a return sludge reaeration zone which is enriched with anhydrous ammonia or an aqueous solution thereof.

U.S. Pat. No. 3,342,727 describes a process for operating a CMAS basin while separating the mixing and aeration functions, holding mixing as an independent variable and aeration as a dependent variable. An agitator is mounted within the center of the basin, and air is supplied to a sparge ring beneath the agitator by an air blower. Attached to the side of the basin is a dissolved oxygen analyzer connected to a dissolved oxygen sensor beneath the surface of the mixed liquor. When changes in the biological food supply occur, a set point control unit effects operation of two control relays which suitably change the speed of the air blower so as to maintain the D.O. level between 1.5 and 2.5 parts per million. No provision is made, however, for process changes to compensate for changes in the weather.

The process of U.S. Pat. No. 4,537,682 controls the microorganism population by controlling the sludge wastage rate, hydraulic residence time, dissolved oxygen level, sludge mixing rate, biological oxygen demand, pH, and temperature for high-strength ammonia-containing wastewaters, possibly containing other contaminants such as phenolic, cyanide, and thiocyanide compounds, in order to nitrify and denitrify in a single reactor. Although it is true that this process is directed to the unusually difficult problem of treating high-strength industrial wastewaters, its seven areas of testing and control impose an onerous burden on a plant operator. Simpler methods of control, particularly for sanitary wastewaters and for wastewaters from food processing plants, are accordingly needed.

Other denitrifying methods also seek to remove phosphorus in addition to nitrogen, as exemplified by U.S. Pat. No. 4,655,925 which discloses a method of removing nitrogen and phosphorus from wastewater by using a mixed liquor comprising the wastewater and activated sludge within a single basin in which are aerating and mixing devices which cannot independently maintain a fixed mixing rate while selectively varying the oxygen transfer rate. However, in attempting to accomplish biological phosphorus removal by a process that includes an anaerobic cycle in which the microorganisms release phosphates to the wastewater and an aerobic cycle in which there is luxury uptake of phosphorus, it is extremely important not to have excessive sludge age in order to prevent cell breakdown and phosphorus release back to the wastewater liquid, resulting in increased effluent phosphorus concentrations. If a long sludge age is allowed to occur in the reactor, then more endogenous respiration will also occur, resulting in cell breakdown and release of stored phosphorus into he wastewater liquid so that there is increased effluent phosphorus concentration.

The cyclical activated sludge process disclosed in U.S. Pat. No. 4,655,925 and in other patents, such as U.S. Pat. No. 4,999,111, must therefore be limited to short Mean Cell Residence Times (MCRT's) in order to accomplish high efficiency biological phosphorus removal. If such removal is attempted through very accurate control of MCRT but at relatively low levels of MCRT in order to avoid difficulties with endogenous respiration and cell breakdown, it can become very difficult to attain a high enough MCRT to accomplish biological denitrification during the winter season. A cyclical CMAS process for a single basin that relates to nitrification and denitrifications only is accordingly needed.

Japanese Patent No. 53-92551 describes a method for waste treatment in a mixed liquor containing 15,000 mg/l or more of microorganisms by alternate reactions in two stages to adjust the D.O. to 0.4 mg/l or less and to 2 mg/l or more while BOD removal, nitrification, and denitrification occur simultaneously in the same reaction vessel. The control methods include cessation of air supply or of inlet wastewater. However, it discloses no method for making adjustments to compensate for changes in: (1) temperature of the wastewater and mixed liquor as the weather, changes, (2) quantity of the food supply, or (3) biomass uptake.

SUMMARY OF THE INVENTION

It is therefore an object of this invention to provide a sequence continuous reactor process that operates within a complete mix activated sludge basin, utilizing long MCRT's for nitrification of wastewaters containing ammonia and for removal of nitrites and nitrates therefrom.

It is another object to use aerating and mixing devices in a GMAS reactor basin which allow for the dissolved oxygen levels, both aerobic and anoxic, to be independently controlled in is accordance with temperature changes in the inlet wastewater and in the mixed liquor.

It is an additional object to cause the biomass in a CMAS system to experience a sine wave type of variation in D.O. concentration, from low D.O. anoxic conditions to high D.O. aerobic conditions.

It is further an object to control separate sequence times independently, accurately, and automatically for the anoxic low D.O. and for the aerobic high D.O. cycles, with much greater accuracy than is possible with the process used in a total barrier oxidation ditch or with the cyclical complete mix activated sludge process disclosed in U.S. Pat. No. 4,917,805.

It is still another object to independently regulate the sequence times for operating under optimum aerobic and anoxic D.O. conditions under all changes in weather conditions, inlet water temperatures, food supply, and biomass concentration and activity.

In accordance with these objects and the principles of this invention, it has been discovered that a continuous flow-through complete mix activated sludge (CMAS) basin can be operated to provide highly efficient nitrogen removal from ammonias contaminated wastewater through biological nitrification-denitrification by sine-wave cycling of oxygen supply and transfer to the mixed liquor to create aerobic high D.O. and anoxic low D.O. cycles of selected duration and at selected levels of dissolved oxygen during both cycles while maintaining mixing with a mixing means either continuously or only during the anoxic cycles, depending upon the adequacy of mixing that is provided by the rising air bubbles. In general, however, continuous mixing with a mixing device is preferable because the device forces the air bubbles to rise in a swirling pattern or to is follow a toroidal pattern, whereby the air bubbles stay in contact with the mixed liquor for a longer time and consequently transfer more oxygen to the liquor.

In this Sequence Continuous Reactor process, the biomass in a complete mix aeration basin experiences not only a sine wave type of variation in D.O. concentration from low D.O. anoxic conditions to high D.O. aerobic conditions, both being at selected set D.O. levels, but also experiences separately controlled and set sequence times for the anoxic low D.O. and the aerobic high D.O. periods which are independently, accurately, and automatically controllable.

This Sequence Continuous Reactor process can be accomplished in any activated sludge aeration basin wherein independent control of wastewater mixing and oxygen transfer is provided by the installed apparatus. For example, a floating surface mixer in combination with diffused aerators along the bottom of the basin can be used. As another example, a fixed platform mixer can be used in combination with subsurface diffused aeration equipment. As a third example, a jet aeration system, which uses subsurface jet diffusers for oxygen transfer and a pump for mixing, can be highly effective.

The CMAS basin, herein often termed a Sequence Continuous Reactor (SCR) basin, can be succeeded by either a gravity clarifier or by a flotation clarifier for clarification of final effluent, with separated biological solids (i.e., activated sludge) being recirculated by a pump back to the upstream basin. Through the use of a continuous reading, self cleaning dissolved oxygen (D.O.) meter and D.O. controller, operating in combination with timer controls, the SCR process can be operated automatically to minimize power consumption and maximize nitrification-denitrification efficiency.

To illustrate this capability, when an air compressor is started by the plant operator, the D.O. level automatically rises until the desired aerobic high D.O. level is reached, at which point the air compressor intake valve is automatically throttled to maintain this desired aerobic sequence D.O.

When the D.O. climbs to the desired preset high D.O., the timer control is activated, thereby allowing the compressor intake valve or blower blow-off valve to be throttled to maintain the desired aerobic D.O. concentration for the preset aerobic sequence time. Upon expiration of this time period, the air compressor or air supply blower is shut down, allowing the D.O. to drop rapidly down to the desired anoxic sequence low D.O. concentration.

When the desired low D.O. is reached, as sensed by the automatic D.O. sensor, another timer control is activated to delay restarting of the air compressor or air supply blower until the desired anoxic sequence time has transpired. When the desired anoxic sequence time has passed, then the air compressor or air supply blower is restarted, allowing the D.O. concentration in the basin to begin to climb back up to the desired aerobic sequence high D.O. level at which point the entire control cycle is repeated.

Through the use of automatic D.O. sensing and control equipment in combination with automatic timer controls, it is possible for the plant operator to easily adjust the exact length of the anoxic and the aerobic sequence times that are desired; the exact low D.O. and high D.O. concentrations are then automatically maintained during both the anoxic and aerobic sequence times.

The activated sludge treatment process of this invention uses sequence continuous reaction for consistently removing biochemical oxygen demand, for removing ammonia by nitrification, and for removing both nitrites and nitrates by denitrification from ammonia-contaminated wastewater during both winter and summer temperature conditions, during conditions varying from warm to cold inlet wastewater temperatures, during extreme variations in food supply, and during pronounced variations in biomass concentration and activity by providing capabilities for selectively adjusting the levels of both aerobic dissolved oxygen and anoxic dissolved oxygen and the durations of both aerobic cycles and anoxic cycles of treatment within a single flowthrough complete mix activated sludge basin which has a hydraulic retention time of a minimum of 6 hours and which contains mixed liquor having a mean cell residence time of at least 6 days.

This process comprises:
A. continuously feeding the wastewater to the basin, wherein:
 1) at least one mixing means thoroughly mixes the wastewater into the mixed liquor in an inlet portion of the basin so that it becomes a part thereof,
 2) at least one aeration means feeds an oxygen-containing gas to the mixed liquor and is cyclically operated for a selected set length of time corresponding to attainment of a selected set level of dissolved oxygen in the mixed liquor during the aerobic cycles within the basin, and
 3) the at least one aeration means is cyclically inoperative for a selected set length of time during the anoxic cycles in the mixed liquor while at least one mixing means is in operation;
B. continuously moving the mixed liquor in a toroidal pattern around the at least one mixing means and gradually and continuously passing the mixed liquor from a first mixing means in the inlet portion to a second and subsequent mixing means, if present, while following a flow-through pattern from the inlet portion of the basin to an outlet portion thereof, whereby the mixed liquor becomes treated mixed liquor;

C. continuously withdrawing the treated mixed liquor from the outlet portion of the basin and feeding the treated mixed liquor to a clarifying means; and D. continuously clarifying the treated mixed liquor to obtain activated sludge and treated and clarified liquor as a nitrified and denitrified effluent.

In this process, all of the sludge is returned to the basin except for a minor amount which is wasted.

Mixing in this process utilizes a fixed power input of about 25 horsepower per million gallons of mixed liquor when the mixed liquor has a mixed liquor suspended solids concentration of about 5,000 mg/l.

The selected set length of time for the aerobic cycle in this process does not affect the set length of time for the anoxic cycle, and the selected set length) of time for the anoxic cycle does not affect the set length of time for the aerobic cycle.

The selected set length of time for either the aerobic or the anoxic cycle changes the number of the aerobic and the anoxic cycles that are undergone by the mixed liquor while passing from the inlet portion to the outlet portion of the basin.

Seasonal changes in ambient temperatures cause changes in temperature of the wastewater being fed to the basin and changes in temperature of the mixed liquor, thereby changing the rate of oxygen uptake by the mixed liquor from the oxygen-containing gas so that the length of the aerobic cycles must be changed in length in order to maintain the desired nitrification rate.

Such changes in wastewater and mixed liquor temperatures additionally cause changes in the rates of reduction of the nitrites and the nitrates by facultative heterotrophic microorganisms in the mixed liquor while consuming carbonaceous BOD, whereby the anoxic cycles must often be changed in length in order to maintain the desired denitrification.

This process also includes capabilities for selective field adjustments of the levels of both aerobic dissolved oxygen and anoxic dissolved oxygen and the durations of both aerobic cycles and anoxic cycles of treatment within the basin.

These field adjustments are made by setting the selected level of dissolved oxygen to be attained and maintained in the mixed liquor during the aerobic cycle and separately during the anoxic cycle and by automatically maintaining and controlling these aerobic and anoxic set point D.O. concentrations by using a continuous reading, self cleaning D.O. meter and by setting, controlling, and maintaining the selected lengths of the aerobic and anoxic cycles on an automatic cycle time controller.

This mixed liquor used in this process has a theoretical mean cell residence time equalling 6-60 days. Industrial waste, as warm wastewater (25° C. or higher), can be treated in 6 days. Wastewater from a chicken processing plant is typically at about 18° C. in winter and about 29° C. in summer (at the latitude of the State of Virginia), but municipal wastewater is at ambient temperature.

In this process, the design minimum food--to-biomass ratio in the basin equals 0.081 pounds of biochemical oxygen demand per pound of mixed liquor suspended solids.

BRIEF DESCRIPTION OF THE DRAWINGS

FIGS. 4A and 4B show CMAS basins, having a single mixer and subsurface aerators therebeneath, and a clarifier.

FIG. 5 shows the apparatuses of FIG. 4 with additional flow lines for sludge and additives.

DESCRIPTION OF THE PREFERRED EMBODIMENTS

Figure 1:
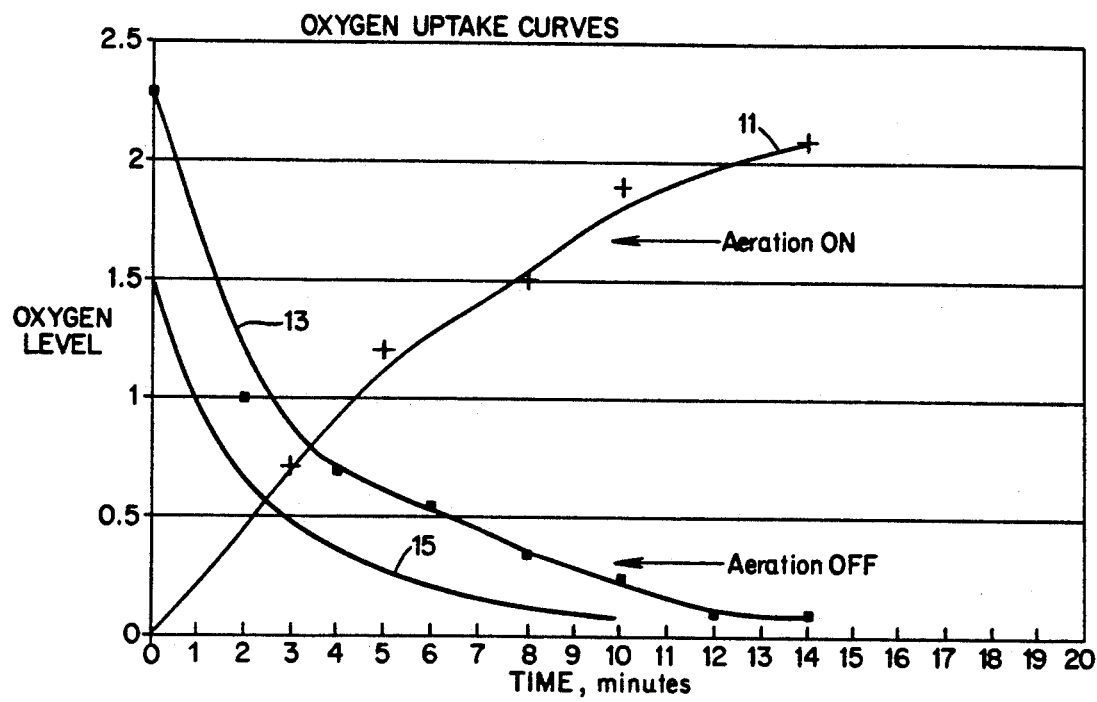
FIG. 1 is a graph showing experimental determination of dissolved oxygen levels is a complete mix activated sludge (CMAS) basin.

Referring to the drawings, FIG. 1 show an experimentally determined curve 11 for oxygen uptake up to a D.O. level of 2.1, another experimentally determined curve 13 for oxygen consumption (without aerating) from a D.O. level of 2.3 mg of oxygen per liter of mixed liquor, and another curve 15, drawn roughly in parallel to curve 13, from a D.O. level of 1.5.

Figure 2:
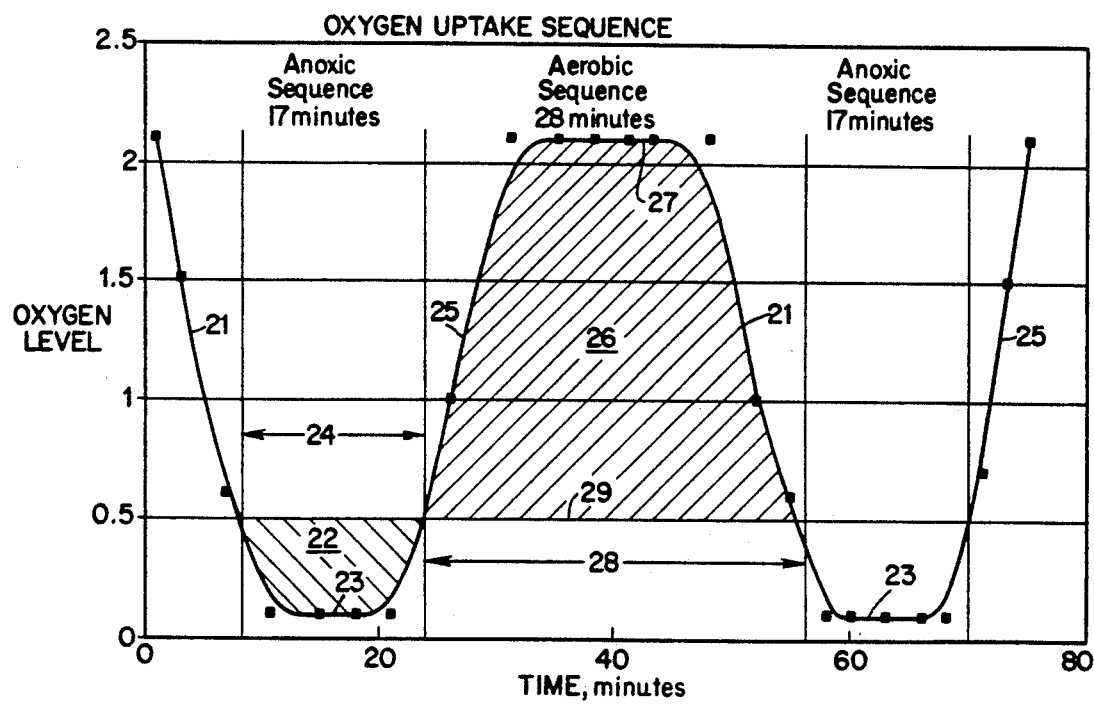
FIG. 2 is a graph showing the slightly flattened sine waves that were experimentally determined in a complete mix activated sludge basin being used as a Sequencing Continuous Reactor.

FIG. 2 is an experimentally determined graph of D.O. levels within aerobic cycles and within anoxic cycles in a CMAS basin being used as a Sequencing Continuous Reactor. The lined areas 22, 26 represent microorganism "work" that is available for denitrification and nitrification, respectively. These areas can be calculated in advance by a microprocessor, into which the temperature of the mixed liquor, the quantity of biomass (MLSS and/or MLVSS), the food-to-biomass (F/M) ratio, the aerobic D.O. level 27, the anoxic D.O. level 23, the elapsed aerobic time 28, and the elapsed anoxic time 24 are entered.

Figure 3A:
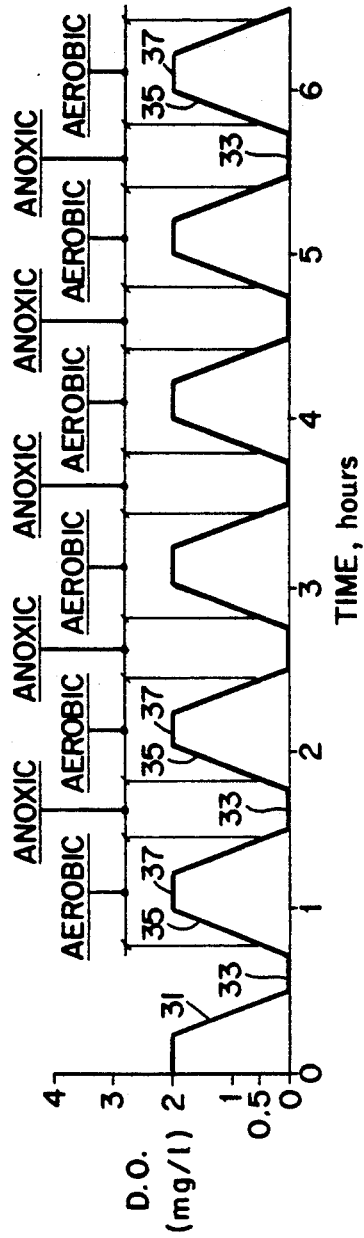
FIGS. 3A and 3B are stylized graphs, similar to FIG. 2, of the aerobic and anoxic cycles typically occurring with dissolved oxygen control in the Sequencing Continuous Reactor (S.C.R.) Process.
Figure 3B:
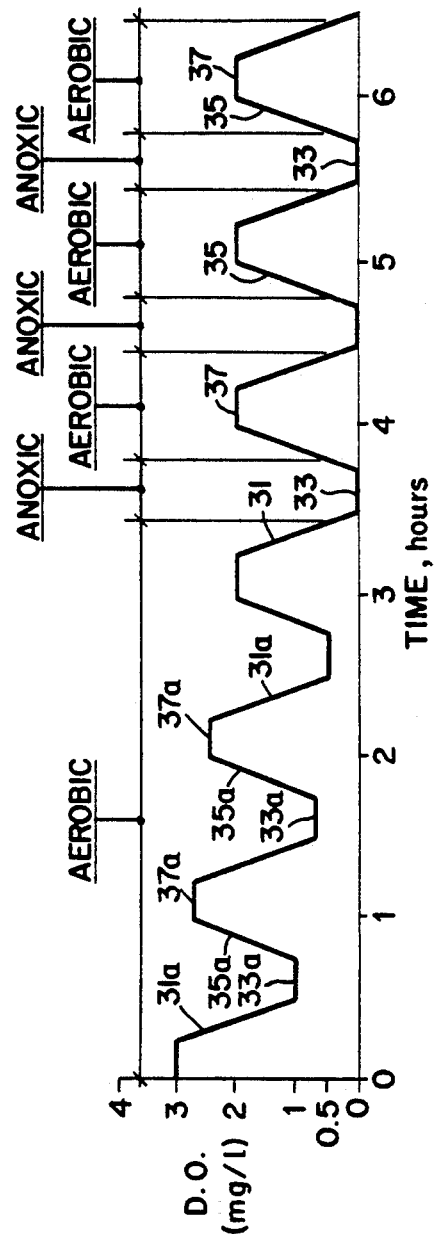

FIG. 3 shows two stylized graphs of the cycles shown in FIG. 2, illustrating steady-state operation at the top and falling D.O. leveling off to steady-state operation at the bottom. Declining D.O. 31, anoxic D.O. 33, rising D.O. 35, and aerobic D.O. 37 are present during the aerobic and anoxic cycles at steady-state operation. Declining D.O. 31a, low D.O. 33a, rising D.O. 35a, and high D.O. 37a exist as the D.O. falls from a D.O. level that has been inadvertently set at an unworkably high level and then reset to a workable level at which the anoxic D.O. is at about 0.1 mg/l.

FIG. 4 shows a Sequence Continuous Reactor 40 and a clarifier 50 being operated in series. The Sequence Continuous Reactor, is a CMAS basin 45 having a single, centrally mounted mixer 47 and subsurface aerators 42 therebeneath. Mixer 47, at surface 46 of the mixed liquor, is shown as turned oft during aerating, but it can readily be operated continuously. Subsurface aerators 42 generate rising bubbles represented by lines 43. When mixer 47 is in operation, it generates a toroid of downwardly and outwardly moving liquor, as represented by lines 49.

Treated liquor 48 is fed to the clarifier in tank 55. Clear liquor at surface 56 is collected in launder 57 and is removed through line 58.

FIG. 5 is much like FIG. 4 except that more detail is shown. It includes Sequence Continuous Reactor 60 and clarifier 70. Influent 61 is fed to basin 63 containing mixed liquor having surface 64, a mixer 65 with blades 66, subsurface aerators 85 which receives air, through line 83 from air supply blowers 81, and a treated liquor discharge line 69. Caustic is supplied by line 68. Recycled sludge is supplied by line 78. Rising bubbles 87 come from aerators 85 to raise the D.O. from 0 to 2.0 mg/l in the mixed liquor. Polymer is fed to line 69 by line 67. Clarifier basin 71 has a sludge sweep 75 and a launder 72 at surface 73 of the liquor. Sludge is pumped as waste activated sludge 77 and recycle sludge 78.

Figure 6:
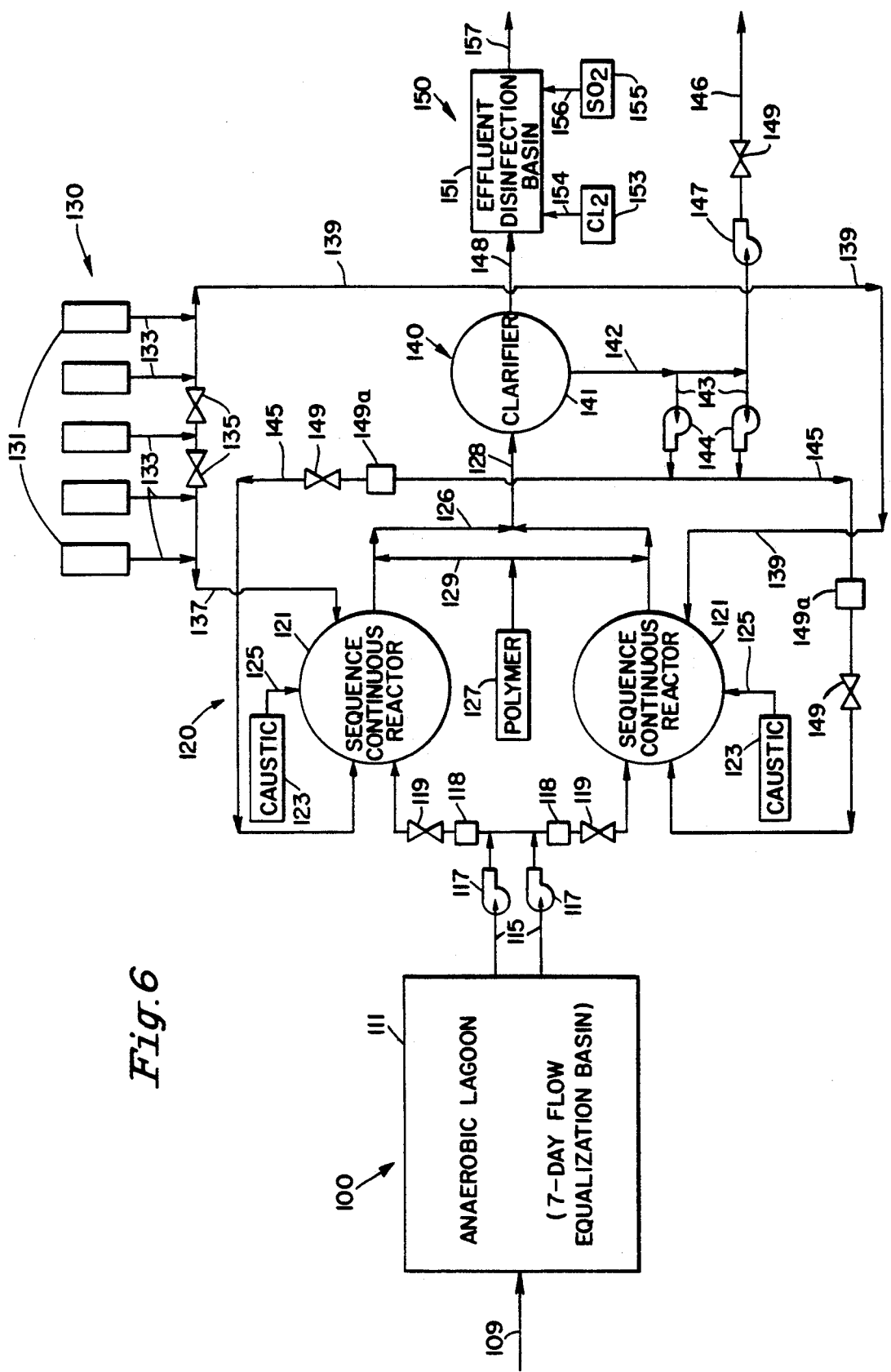
FIG. 6 is a plan view of a wastewater treatment system utilizing the Sequence Continuous Reactor Process of this invention.

FIG. 6 is a plan view of a waste-water treatment system which incorporates an anaerobic lagoon 100, two Sequence Continuous Reactors 120, a compressor station 130, a clarifier 140, and an effluent disinfection system 150, as more fully set forth in the following illustrative Examples of a Sequence Continuous Reactor system operated in an actual installation that is fully equipped with controls but is presently being conventionally operated.

EXAMPLE 1

On a daily basis, 3 million gallons per day (3 MGD) of screened, raw wastewater from a poultry slaughtering plant are fed as stream 109 to an anaerobic lagoon basin 111 which provides 7-day flow equalization, as shown in FIG. 6. Blood and other proteins are therein converted to ammonia and other substances. The outflow moving through dual outflow lines 115 is sampled in mid-July and analyzed. The results are:

| temperature | 28° C. |
|---|---|
| pH | 6.5 |
| BOD | 1,000 mg/l |
| NH3 | 180 mg/l |
| O & G | 100 mg/l |
| TSS | 300 mg/l |

An effluent pump 117 in each line 115 moves the wastewater from basin 111 through a magnetic flowmeter 118, a flow indicator, a totalizer, and a recorder, and then through a valve 119 to become feed to an inlet portion of one of two Sequence Continuous Reactor basins 121. Each basin 121 has a volume of 3.7 million gallons of mixed liquor having about 3,000 mg/l of MLSS during the summer season and is designed to handle about 0.081 pounds of biochemical oxygen demand (BOD)/pound of MLSS.

Caustic is selectively fed to each basin 121 from a pair of caustic tanks 123 through lines 125, and polymer is also fed from a single tank 127 through lines 129 to basin discharge lines 126. Compressed air at 12.7 psig is generated in five 200-hp compressors 131, using two for each basin 121 and one as standby, and is then fed through lines 133, valves 135, and lines 137, 139 to subsurface aerators in basins 121, such as those shown in detail in FIGS. 4 and 5.

The aerobic cycle is set at 28 minutes, the D.O. level is set at 2.0 mg/l, and the anoxic cycle is set at 18 minutes, thereby providing 77 aerobic cycles and 77 anoxic cycles to the wastewater during its passage from the inlet portions to the outlet portions of basins 121.

Treated effluent from the outlet portions of basins 121 receives polymer from single tank 127 through lines 129 and flows through lines 126, 128 to clarifier 141, such as the clarifiers in FIGS. 4 and 5. Its capacity is about 2.6 million gallons.

The clarified liquor from clarifier 141 is discharged through line 148 to disinfecting basin 151 for effluent disinfection by chlorination, using chlorine which is fed to basin 151 through line 154 from tank 153, and for dechlorination, using sulfur dioxide which is fed to basin 151 through line 156 from tank 155. The disinfected, clarified liquor is then fed to a receiving stream as clear water. Samples taken from line 148 are analyzed, with the following results:

| temperature | 26° C. |
|---|---|
| pH | 6.8 |
| BOD | 5 mg/l |
| NH3 | 0.5 mg/l |
| NO2—N | 0.1 mg/l |
| NO3—N | 2.0 mg/l |
| TSS | 10 mg/l |

Most of the sludge recovered from clarifier 141 is pumped through lines 142, 143, 145 and sludge return pumps 144 to basins 121, wherein it is rapidly admixed with the mixed liquor, but a small portion is discharged through line 146 by sludge waste pump 147 to a waste sludge lagoon or to a flotation thickener, prior to ultimate disposal by land application.

EXAMPLE 2

Anaerobic lagoon 100, SCR basins 120, compressors 130, clarifier 140, and disinfection basin 150 of Example 1 continue to operate, but by Thanksgiving the ambient air and the inlet wastewater to SCR basins 120 are noticeably cooler. Moreover, ammonia contents of the clarified liquor in line 148 during the past three weeks are out of specification on four occasions, indicating poor nitrification. Samples are taken four days after Thanksgiving of the wastewater in line 115, blended, and analyzed with the following results:

| temperature | 20° C. |
|---|---|
| pH | 6.5 |
| BOD | 1100 mg/l |
| NH3 | 165 mg/l |
| O & G | 60 mg/l |
| TSS | 325 mg/l |

The operator decides that a higher dissolved oxygen level is needed and sets it at 2.5 mg/l while maintaining the length of the aerobic cycle at 28 minutes and increasing the length of the anoxic cycle from 18 minutes to 23 minutes in order to improve denitrification because he knows that the facultative microorganisms slow down appreciably during colder weather.

EXAMPLE 3

The change in the D.O. level described in Example 2 does not reduce the ammonia content of the clarified liquor in line 148 with enough consistency, and, in addition, the weather is becoming colder. However, the nitrite and nitrate levels are sufficiently low, indicating that the anoxic cycle is long enough and the anoxic D.O. is low enough.

The operator consequently decides to lengthen the aerobic cycle even though, combined with the longer anoxic cycle, it will significantly decrease the number of cycles that the mixed liquor will be subjected to while travelling from the inlet portions of basins 121 to the outlet portions thereof. About a week after making the corrections described in Example 2, he changes the aerobic cycle from 28 minutes to 33 minutes. After three days to allow the system to equilibrate itself, samples are again taken from lines 115 and from line 148. The results are as follows:

|  | inflow in lines 115 | treated liquor in line 148 |
|---|---|---|
| temperature | 20° C. | 15° C. |
| pH | 6.4 | 6.8 |
| BOD | 1250 mg/l | 5 mg/l |
| $NH_3$ | 175 mg/l | 0.5 mg/l |
| $NO_2$—N | 0 mg/l | 0.1 mg/l |
| $NO_3$—N | 0 mg/l | 2.5 mg/l |
| O & G | 60 mg/l | 2.0 mg/l |
| TSS | 350 mg/l | 10 mg/l |

The operator is satisfied that these changes are adequate but resolves to keep close watch on the system, knowing that much colder weather will arrive in January and February.

What is claimed is:

1. A sequence continuous reaction process for consistently removing biochemical oxygen demand, for removing ammonia by nitrification, and for removing both nitrites and nitrates by denitrification from ammonia-contaminated wastewater during both winter and summer temperature conditions, during conditions varying from warm to cold inlet wastewater temperatures, during extreme variations in food supply, and during pronounced variations in biomass concentration and activity by providing capabilities for selectively adjusting the levels of both aerobic dissolved oxygen and anoxic dissolved oxygen and the durations of both aerobic cycles and anoxic cycles of treatment within a single flow-through complete mix activated sludge basin into which said ammonia-contaminated wastewater is fed, said basin being equipped with at least one mixing means, at least one aeration means, dissolved oxygen sensors, and timer controls, which has a hydraulic retention time of a minimum of 6 hours and which contains mixed liquor having a mean cell residence time of at least 6 days, treated mixed liquor from said basin being fed to a clarifying means which produces sludge and clarified liquor, said process comprising:

A. measuring the carbonaceous biochemical oxygen demand, total Kjeldahl nitrogen, ammonia, nitrate nitrogen, and nitrite nitrogen in said ammonia-contaminated wastewater being fed to said basin;

B. setting a selected dissolved oxygen level for said mixed liquor during said aerobic cycles within said basin;

C. setting a selected dissolved oxygen level for said mixed liquor during said anoxic cycles within said basin;

D. setting a selected length of time for said aerobic cycles within said basin;

E. setting a selected length of time for said anoxic cycles within said basin;

F. measuring carbonaceous biochemical oxygen demand, alkalinity, pH, ammonia, nitrate nitrogen, and nitrite nitrogen in said clarified liquor;

G. adjusting said aerobic dissolved oxygen level and/or said selected set length of time for said aerobic cycles in proportion to said biochemical oxygen demand in said inlet wastewater and in proportion to said nitrate nitrogen and said nitrite nitrogen in said clarified liquor; and H. adjusting said anoxic dissolved oxygen level and/or said selected set length of time for said anoxic cycles in proportion to said biochemical oxygen demand in said inlet wastewater and in proportion to said nitrate nitrogen and said nitrite nitrogen in said clarified liquor.

2. The process of claim 1 which further comprises:

A. continuously feeding the wastewater to said basin and operating said at least one mixing means which is in continuous operation during said anoxic cycles, whereby said wastewater is thoroughly mixed into and becomes a part of said mixed liquor in an inlet portion of said basin;

B. cyclically operating said at least one aeration means, for feeding an oxygen-containing gas to said mixed liquor, for said selected set length of time corresponding to attainment and maintenance of said selected set dissolved oxygen level in said mixed liquor during said aerobic cycles within said basin;

C. cyclically not operative said at least one aeration means for said selected set length of time in said mixed liquor during said anoxic cycles;

D. gradually and continuously passing said mixed liquor from a first said mixing means in said inlet portion to an outlet portion thereof, whereby said mixed liquor becomes treated mixed liquor;

E. continuously withdrawing said treated mixed liquor from said outlet portion of said basin and feeding said treated mixed liquor to said clarifying means; and F. continuously clarifying said treated mixed liquor to obtain said activated sludge and said clarified liquor as a nitrified and denitrified effluent.

3. The process of claim 2, wherein a major portion of said activated sludge is returned to said basin, a minor portion of said activated sludge being withdrawn as waste activated sludge.

4. The process of claim 2, wherein said mixing means utilizes a fixed power input of about 25 horsepower per million gallons of said mixed liquor when said mixed liquor has a mixed liquor suspended solids concentration of about 5,000 mg/l.

5. The process of claim 2, wherein:

A. said operating of said mixing means is continuous during both said aerobic cycles and said anoxic cycles;

B. said selected set length of time for said aerobic cycles does not affect said selected set length of time for said anoxic cycles; and C. said selected set length of time for said anoxic cycles does not affect said selected set length of time for said aerobic cycles.

6. The process of claim 5, wherein said selected set length of time for either said aerobic or said anoxic cycles determines the number of said aerobic and said anoxic cycles that are undergone by said mixed liquor while passing from said inlet portion to said outlet portion of said basin.

7. The process of claim 5, wherein said aerobic cycles are changed in length in order to maintain said nitrification when seasonal changes in ambient temperature cause changes in temperature of said wastewater being fed to said basin and/or changes in temperature of said mixed liquor, whereby the rate of oxygen uptake by said mixed liquor from said oxygen-containing gas is changed.

8. The process of claim 7, wherein said selected set length of time of said anoxic cycles is changed in order to maintain said denitrification when said changes in wastewater and mixed liquor temperatures additionally cause changes in the rates of reduction of said nitrites and said nitrates by facultative heterotrophic microorganisms in said mixed liquor while consuming said carbonaceous biochemical oxygen demand.

9. The process of claim 8, wherein said capabilities include field adjustments in said selected set lengths of time of said aerobic cycles and of said anoxic cycles.

10. The process of claim 9, wherein said field adjustments are made by setting said selected dissolved oxygen level to be attained and maintained in said mixed liquor during said aerobic cycles and separately during said anoxic cycles by automatically maintaining and controlling said aerobic and anoxic set point concentrations of dissolved oxygen by use of a continuous reading and self-cleaning dissolved oxygen meter and by setting, controlling, and maintaining said selected lengths of time of said aerobic and anoxic cycles by using automatic cycle timer controls and by setting said selected lengths of time for said aerobic and anoxic cycles on a continuous reading, self cleaning, dissolved oxygen meter and a dissolved oxygen controller, operated in combination with timer controls.

11. The process of claim 8, wherein the amount of microorganism "work" that is available for denitrification and nitrification is calculated in advance by a microprocessor into which the temperature of said mixed liquor, the quantity of biomass, the food-to-biomass ratio, pH, said aerobic dissolved oxygen level, said anoxic dissolved oxygen level, said selected set length of time for said aerobic cycles, and said selected set length of time for said anoxic cycles are entered.

12. The process of claim 2, wherein said mixed liquor has a theoretical means cell residence time equalling 6-60 days.

13. The process of claim 2, wherein the design minimum food-to-biomass ratio in said basic under winter season operating conditions is at least 0.025 pound of carbonaceous biochemical oxygen demand per pound of mixed liquor suspended solids.

14. The process of claim 2, wherein said mixed liquor passes from said first mixing means in said inlet portion to a second and subsequent said mixing means while following a flow-through pattern from said inlet portion to said outlet portion of said basin.

15. The process of claim 2, wherein said at least one mixing means is a floating surface mixer in combination with diffused aerators along the bottom of said basin.

16. The process of claim 2, wherein said at least one mixing means is a fixed platform mixer which is used in combination with subsurface diffused aeration equipment.

17. The process of claim 2, wherein said at least one mixing means is a jet aeration system which uses subsurface jet diffusers for oxygen transfer and a pump for mixing said mixed liquor.

18. The process of claim 1, wherein in response to a change in said ammonia in said inlet wastewater, as shown by said measuring according to Step F, said adjusting according to Step G, with respect to either said aerobic cycles or to said anoxic cycles, is made to said dissolved oxygen level while keeping said selected set length of time unchanged or is made to said selected set length of time while keeping said dissolved oxygen level unchanged.

19. The process of claim 1, wherein in response to a change in said nitrate nitrogen and said nitrite nitrogen that indicates a change in said nitrification or said denitrification, as shown by said measuring according to Step F in said clarified liquor, said adjusting according to Step G, with respect to either said aerobic cycles or to said anoxic cycles, is made to said selected set length of time while keeping said dissolved oxygen level unchanged.

20. The process of claim 2, wherein said clarifier is a gravity clarifier.

21. The process of claim 2, wherein said clarifier is a flotation clarifier.

* * * * *